(12) United States Patent
Oh et al.

(10) Patent No.: US 7,957,883 B2
(45) Date of Patent: Jun. 7, 2011

(54) HANDHELD INFORMATION DEVICE AND CONTROL METHOD THEREOF

(75) Inventors: Ui-taek Oh, Suwon-si (KR); Jeong-seok Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1118 days.

(21) Appl. No.: 11/724,176

(22) Filed: Mar. 15, 2007

(65) Prior Publication Data

US 2008/0051970 A1    Feb. 28, 2008

(30) Foreign Application Priority Data

Aug. 22, 2006  (KR) .......................... 10-2006-0079438

(51) Int. Cl.
*G06F 3/14*   (2006.01)
(52) U.S. Cl. ..................................... 701/93; 340/995.1
(58) Field of Classification Search .................. 701/93, 701/207–212; 340/995.1, 995.11–995.19, 340/880
See application file for complete search history.

(56) References Cited

U.S. PATENT DOCUMENTS

| | | | |
|---|---|---|---|
| 6,266,589 B1 * | 7/2001 | Boies et al. ..................... 701/36 |
| 6,320,517 B1 * | 11/2001 | Yano et al. ............... 340/995.15 |
| 6,567,744 B1 | 5/2003 | Katayama et al. | |
| 6,714,863 B2 * | 3/2004 | Katayama et al. ............ 701/209 |
| 7,308,341 B2 * | 12/2007 | Schofield et al. ................. 701/1 |
| 7,463,281 B2 * | 12/2008 | Luskin et al. ................. 348/148 |
| 2002/0122027 A1 | 9/2002 | Kim | |

FOREIGN PATENT DOCUMENTS

| | | |
|---|---|---|
| CN | 1251435 A | 4/2000 |
| CN | 1313503 A | 9/2001 |
| CN | 1527178 A | 9/2004 |
| KR | 2000-33660 | 6/2000 |
| KR | 2006-22114 | 3/2006 |
| KR | 2006-24493 | 3/2006 |

* cited by examiner

*Primary Examiner* — Dalena Tran
(74) *Attorney, Agent, or Firm* — Jefferson IP Law, LLP

(57) ABSTRACT

A handheld information device, including: a display part to display one or more control menus; and a controller to calculate a velocity of a vehicle, and to control the display part to display an enlarged control menu relatively increased in size than a predetermined control menu on the display part if the calculated velocity is faster than a predetermined reference velocity.

43 Claims, 6 Drawing Sheets

HANDHELD INFORMATION DEVICE AND CONTROL METHOD THEREOF

CROSS-REFERENCE TO RELATED APPLICATION

This application claims the benefit of Korean Patent Application No. 2006-79438 filed on Aug. 22, 2006, in the Korean Intellectual Property Office, the disclosure of which is incorporated herein by reference.

BACKGROUND OF THE INVENTION

1. Field of the Invention

Aspects of the present invention relate to a handheld information device and a control method thereof, and more particularly, to a handheld information device and a control method thereof that provide a control menu that a user can conveniently manipulate while driving a vehicle.

2. Description of the Related Art

In addition to a simple navigation function to show a destination path to a user, a navigation apparatus that is a handheld information device for a vehicle has been developed to include various functions, such as a Digital Multimedia Broadcasting (DMB) receiving function, a Digital Versatile Disc (DVD) player function, and a Moving Picture Expert Group (MPEG) player function according to a technical development and a user's various demands. Particularly, the DMB receiving function is a popular function of the handheld information device because a user can watch a DMB program in real-time while driving a vehicle.

FIG. 1 is a view illustrating a screen configuration when a received DMB program is displayed on a display screen 100 of the handheld information device for a vehicle. The display screen 100 of the handheld information device includes a first portion 110 to display a DMB video, a second portion 120 to display corresponding video information, and a third portion 130 to display a corresponding control menu.

However, an accident risk is increased because a size of the control menu displayed on the third portion 130 is too small for a user driving the vehicle to manipulate and thus control the DMB video and/or a corresponding audio.

SUMMARY OF THE INVENTION

Accordingly, aspects of the present invention provide an information device and a control method thereof, which provide a control menu that a user can conveniently manipulate while, for example, driving a vehicle.

According to an aspect of the present invention, there is provided an information device used in a vehicle, the information device including: a display part to display one or more control menus; and a controller to calculates a velocity of the vehicle, and to control the display part to display an enlarged control menu relatively increased in size than a predetermined control menu on the display part if the calculated velocity is greater than a predetermined reference velocity.

The handheld information device may further include a touch screen provided on a display surface of the display part, wherein if a touch area of the enlarged control menu is touched, the controller performs a function corresponding to the enlarged control menu displayed on the display part.

The controller may display the predetermined control menu if the calculated velocity is less than the predetermined reference velocity.

The handheld information device may further include a menu information generating part to generate at least one of the predetermined control menu and the increased control menu.

The handheld information device may further include a video processing part to generate video data based on an inputted video signal; and a video combining part to combine the generated video data and at least one of the predetermined control menu data and the enlarged control menu and to output the combined data to the display part.

The video processing part may generate the video data to decrease or increase a corresponding viewing window depending on a size of one of the enlarged control menu and the predetermined control menu.

The video processing part may generate the video data to decrease or increase a corresponding viewing window by performing a scaling from wide video data to normal video data or from normal video data to wide video data.

The video combining part may combine the generated video data and the enlarged control menu data by changing their positions displayed on the display part if the generated video data and the enlarged control menu are superposed on each other.

The controller may process the enlarged control menu to be displayed more transparently than the predetermined control menu if the enlarged control menu data is generated.

The handheld information device may further include a tuner to tune a broadcast channel, wherein if the calculated velocity of the vehicle is faster than the predetermined reference velocity, the controller displays the enlarged channel menu on the display part, and if a display area of the enlarged channel menu is selected, the controller controls the tuner depending on a function corresponding to the enlarged channel menu.

The handheld information device may further include an audio processing part to generate audio data from a received audio signal, wherein if the calculated velocity of the vehicle is faster than the predetermined reference velocity, the controller displays an enlarged audio menu on the display part, and if a display area of the enlarged audio menu is selected, the controller controls the audio processing part depending on a function corresponding to the enlarged audio menu.

According to another aspect of the present invention, there is provided an information device used in a vehicle, the information device including: a display part to display video data; a video processing part to generate the video data based on an inputted video signal; and a controller to control the video processing part to display the video data on the display part and to calculate a velocity of the vehicle such that if a velocity of a vehicle is greater than a predetermined reference velocity the controller divides the display part into a plurality of sections and selects at least one section of the divided sections for a control menu area.

The handheld information device may further include a tuner to tune a broadcast channel, wherein the controller allocates a channel button area on the control button area of the selected section, and controls the tuner depending on a function corresponding to the channel button area if the channel button area is selected.

The controller may locate a channel-up button at a portion of the channel button area on an upper area of the display part, and a channel-down button at a portion of the channel button area on a lower area of the display part.

The handheld information device may further include an audio processing part to process audio data, wherein the controller allocates a volume button area on the control button area of the selected section, and controls the audio processing part depending on a function corresponding to the volume button area if the volume button area is selected.

The controller may locate a volume-up button at a portion of the volume button area on a right area of the display part, and a volume-down button at a portion of the volume button area on a left area of the display part.

According to another aspect of the present invention, there is provided a control method of an information device used in a vehicle, the method including: calculating a velocity of the vehicle; displaying an enlarged control menu relatively increased in size than a predetermined control menu on a display part if the calculated velocity of the vehicle is greater than a preset predetermined reference velocity; and performing a function corresponding to the enlarged control menu if a display area of the enlarged control menu is selected.

The control method may further include generating video data to decrease or increase a corresponding viewing window depending on a size of one of the enlarged control menu and the predetermined control menu.

The displaying of the enlarged control menu may include processing the enlarged control menu to display the enlarged control menu more transparently than the predetermined control menu.

According to yet another aspect of the present invention, there is provided a control method of an information device used in a vehicle, the method including: calculating a velocity of the vehicle; dividing the display part into a plurality of sections and selecting at least one section of the divided sections for a control button area if the calculated velocity of the vehicle is greater than a predetermined reference velocity; and performing a function corresponding to the control button area if the control button area is selected.

The selecting of the section for the control button area may include locating a channel-up button at a portion on an upper area of the display part, and a channel-down button at a portion on a lower area of the display part.

The selecting of the section for the control button area may include locating a volume-up button at a portion on a right area of the display part, and a volume-down at a button portion on a left part of the display part.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
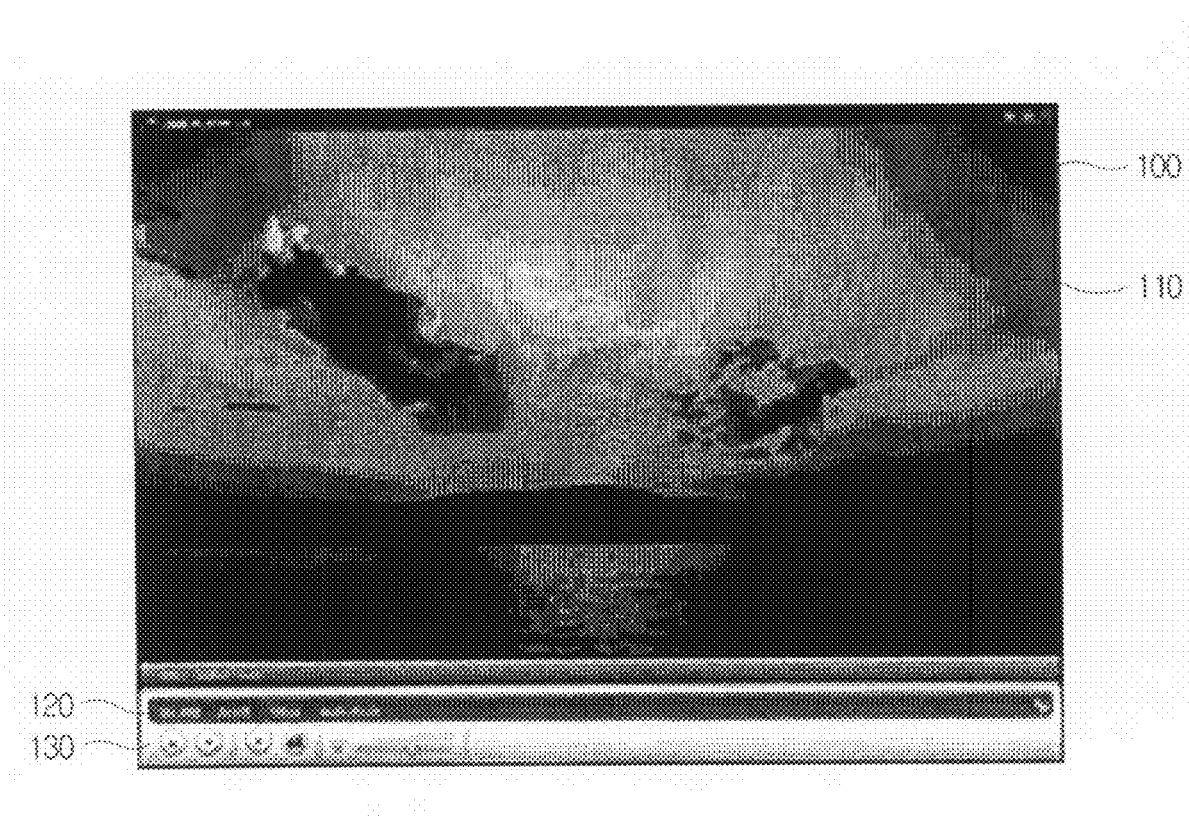
FIG. 1 is a view illustrating a screen configuration of a display part of a conventional handheld information device.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
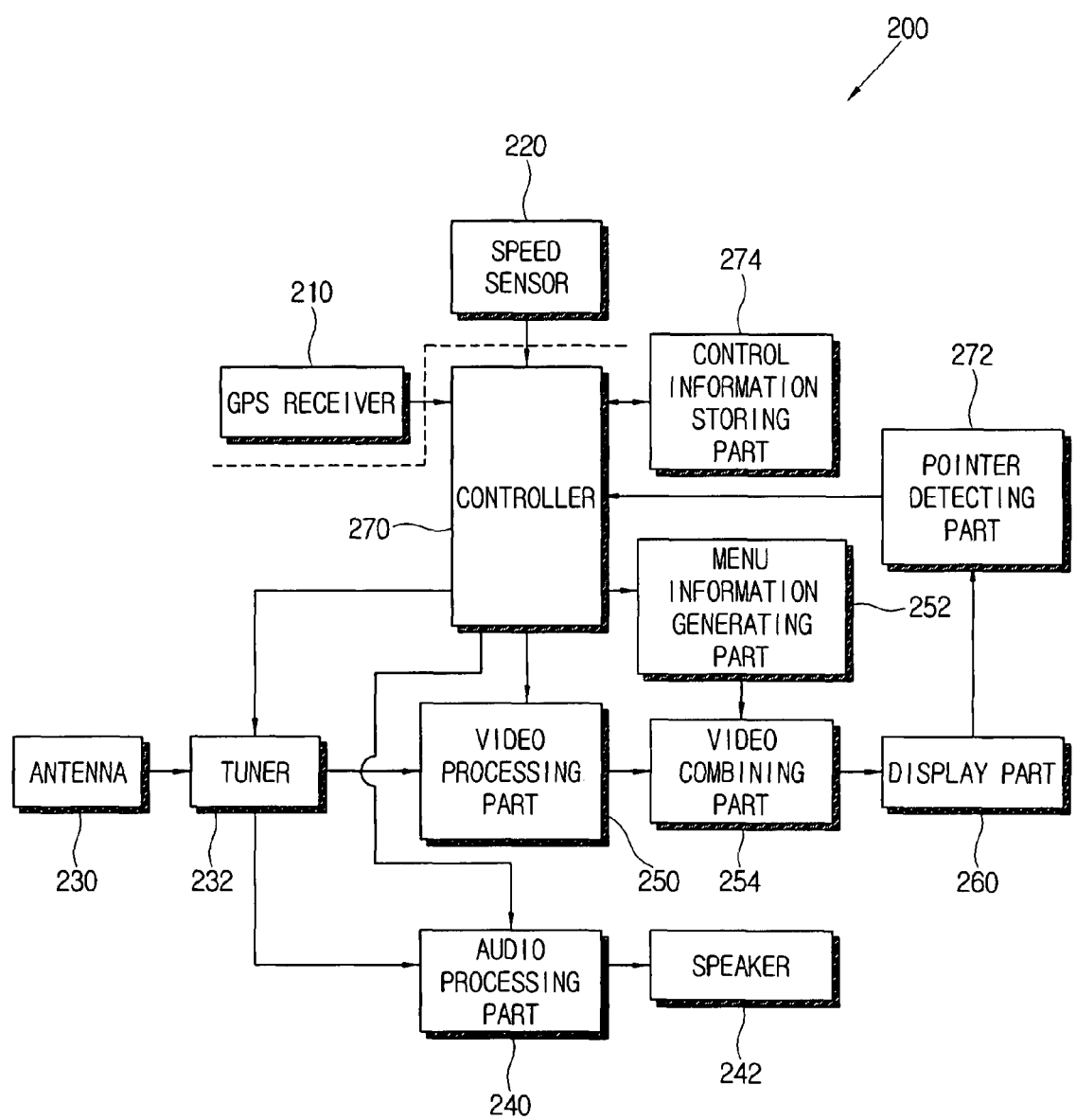
FIG. 2 is a view illustrating a configuration of a handheld information device according to an embodiment of the present invention.

FIG. 2 is a view illustrating a configuration of a handheld information device 200 according to an embodiment of the present invention. The handheld information device 200 is connected to a GPS receiver 210 and a speed sensor 220. It is understood that aspects of the present invention are not necessarily limited to a handheld device, but may also be applied to any mobile or compact device, such as an in-dash navigation system.

The GPS receiver 210 receives location information of a vehicle from a satellite, and the speed sensor 220 measures a driving speed of the vehicle. A controller 270 (to be described later) calculates a current location of the vehicle from the location information, and calculates a velocity of the vehicle from the measured driving speed.

The handheld information device 200 includes an antenna 230, a tuner 232, an audio processing part 240, a video processing part 250, a menu information generating part 252, a video combining part 254, a display part 260, the controller 270, a pointer detecting part 272, and a control information storing part 274. The handheld information device 200 may also include a speaker 242, although not necessarily.

The antenna 230 receives a satellite digital broadcast signal and/or a ground wave digital broadcast signal and provides the signal to the tuner 232. The tuner 232 tunes a digital broadcast signal of a frequency corresponding to a channel selected by a user through, for example, a channel menu from the plurality of digital broadcast signals received by the antenna 230. Also, the tuner 232 processes the digital broadcast signal to divide the digital broadcast signal into a digital video signal and a digital audio signal. At this time, the digital video signal is outputted to the video processing part 250, and the digital audio signal is outputted to the audio processing part 240.

The audio processing part 240 generates audio data by decoding the digital audio signal received from the tuner 232. The generated audio data may be outputted through the speaker 242. Further, a user may adjust a volume of the audio data generated through the audio processing part 240 by manipulating a volume menu displayed on the display part 260.

The video processing part 250 generates video data by processing the digital video signal inputted from the tuner 232, and provides the generated video data to the video combining part 254. Further, the video processing part 250 may generate the video data to decrease or increase a corresponding viewing window according to a video control signal of the controller 270. Here, the screen is displayed on the display part 260. At this time, the video processing part 250 may include a scaler to perform a scaling from wide video data to normal video data or from normal video data to wide video data, thereby decreasing or increasing the viewing window. Specifically, the wide video data indicates video data having a corresponding screen ratio of 16:9, the normal video data indicates video data having a corresponding screen ratio of 4:3.

Figure 4:
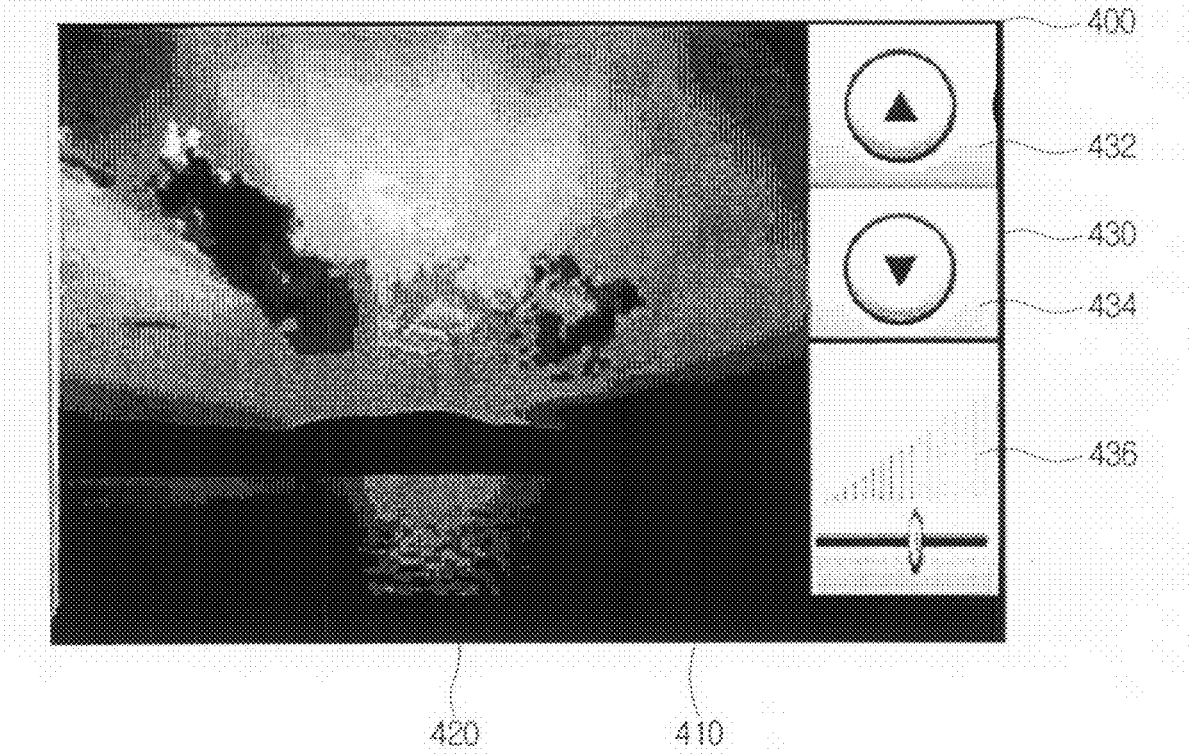
FIG. 4 is a view illustrating a screen configuration of the handheld information device and the control method thereof according to an embodiment of the present invention.

The menu information generating part 252 generates a plurality of control menus to display on the display part 260. For example, the menu information generating part 252 generates a first control menu related to road information and a second control menu related to receiving a DMB signal (such as a channel-up menu, a channel-down menu, and an audio menu). According to an aspect of the present invention, if the velocity of the moving vehicle is less than a predetermined reference velocity, predetermined control menus are displayed on a first portion 130, as illustrated in FIG. 1, in a lower area of the display screen 100. On the other hand, if the velocity of the moving vehicle is greater than the predetermined reference velocity, key control menus increased in size than the predetermined control menus, as illustrated in FIG. 4, are displayed on a right area of a display screen 400. Here, the key control menus indicate the control menus corresponding functions that are more essential than other functions to control a video displayed on the display screen 400. It is understood that the key control menus may be set by a user. Furthermore, it is understood that the key control menus may be displayed when a user configures the display screen 400 to display the key control menus and/or as a default when the speed sensor 220 detects that the vehicle is moving.

The video combining part 254 combines the video data generated by the video processing part 250 and the control menu generated by the menu information generating part 252, and provides the combined data to the display part 260. At this time, the video combining part 254 may combine the video data and the control menu by changing their displayed positions on the display part 260.

The display part 260 displays the combined data or the control menu provided from the video combining part 254. Herein, the display part 260 includes a touch screen provided as one body therewith. The touch screen provided on a display surface of the display part 260 may employ any touching methods or devices to receive a user input. For example, the touch screen may employ a touching pen capable of indicating any desired position of a coordinate value preset thereon corresponding to the control menu displayed on the display part 260. However, it is understood that other input devices other than a touch screen may be used to receive a user input.

If a user touches a position of a desired control menu displayed on the touch screen of the display part 260 by using, for example, the touching pen, the pointer detecting part 272 detects a preset coordinate value corresponding to the position touched by the user.

The control information storing part 274 stores the respective preset coordinate values on the touch screen corresponding to the control menus displayed on the display part 260, and information related to a function corresponding to the respective control menus.

The controller 270 determines which control menu is touched by the user by comparing the coordinate value detected by the point detecting part 272 with the respective coordinate values corresponding to the control menus, which are stored in the control information storing part 274. Then, the controller 270 performs a function corresponding to the determined control menu. For example, if the determined control menu is a volume menu, the controller 270 outputs a volume control signal to the audio processing part 240 to adjust a volume. If the determined control menu is a channel menu, the controller 270 outputs a channel control signal to change a channel to the tuner 232.

Figure 3:
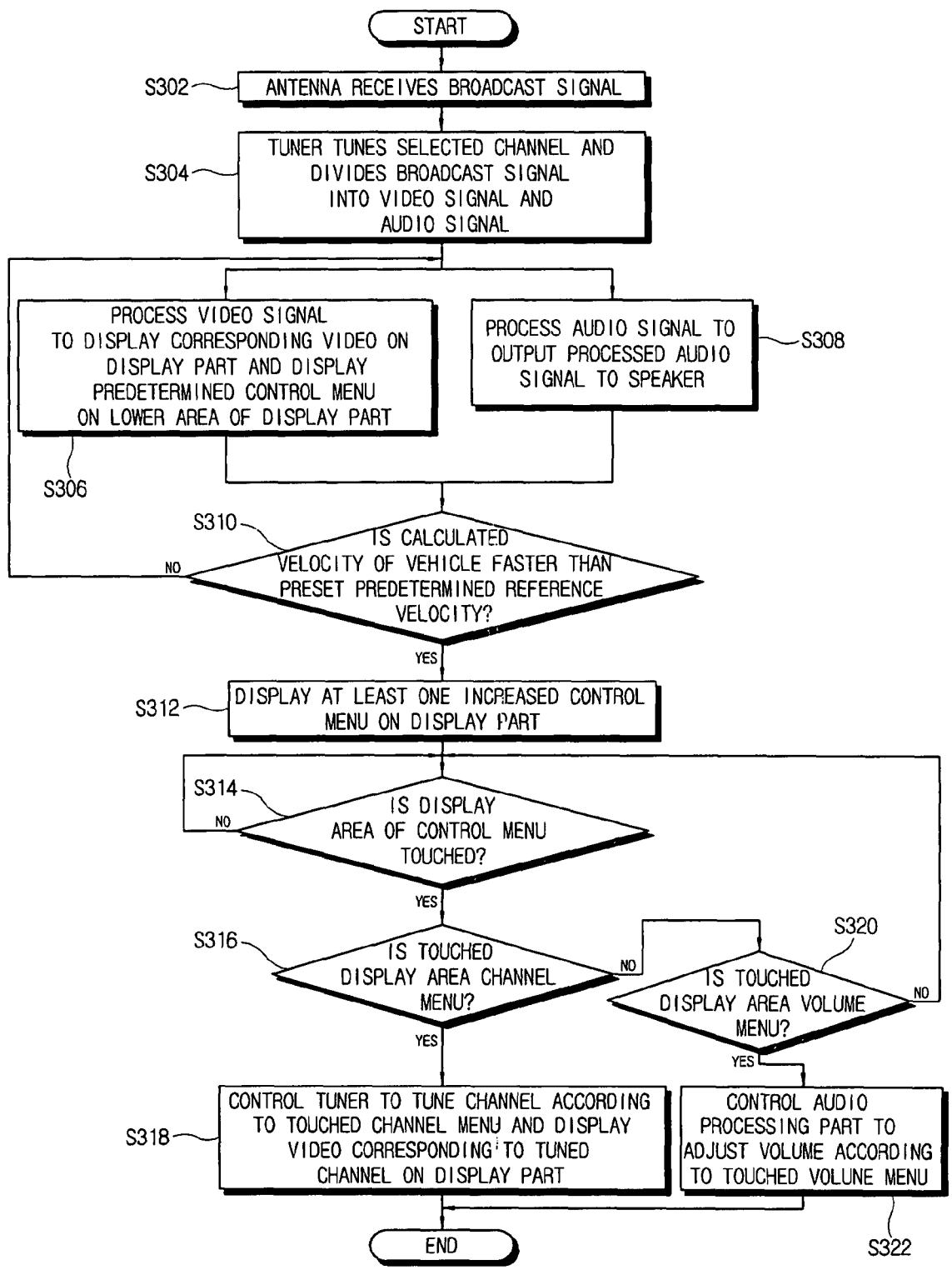
FIG. 3 is a flowchart illustrating a control method of the handheld information device according to an embodiment of the present invention.

FIG. 3 is a flowchart illustrating a control method of the handheld information device 200 according to an embodiment of the present invention, and FIG. 4 is a view illustrating a screen configuration of the handheld information device 200 and the control method thereof according to an embodiment of the present invention.

The antenna 230 receives a satellite digital broadcast signal and/or a ground wave digital broadcast signal (operation S302). If a user selects, for example, a channel menu from among a plurality of control menus displayed on the display part 260, the tuner 232 tunes the digital broadcast signal having a frequency corresponding to a channel selected by the user through, for example, the channel menu from the digital broadcast signals received by the antenna 230. Also, the tuner 232 processes the digital broadcast signal to divide the digital broadcast signal into a digital video signal and a digital audio signal. At this time, the digital video signal is outputted to the video processing part 250, and the digital audio signal is outputted to the audio processing part 240 (operation S304).

The video processing part 250 processes the digital video signal inputted from the tuner 232 to generate video data, and outputs the generated video data to the video combining part 254. Further, the controller 270 controls the menu information generating part 252 to generate predetermined control menus so as to display the corresponding predetermined control menus on a lower area of the display part 260, and to output the generated predetermined control menus to the video combining part 254. The video combining part 254 combines the video data and the predetermined control menus to display a corresponding combined video on the display part 260 (operation S306).

The audio processing part 240 decodes the digital audio signal to generate audio data, and outputs the generated audio data through, for example, the speaker 242 (operation S308).

While a vehicle moves, the speed sensor 220 detects a driving speed of the vehicle and transmits the detected driving speed to the controller 270. The controller 270 calculates a velocity of the moving vehicle from the detected driving speed. Further, the controller 270 checks whether the calculated velocity is faster than a predetermined reference velocity (operation S310). For example, the predetermined reference velocity may be set to 40 Km/h.

If the calculated velocity is greater than the predetermined reference velocity, the controller 270 enlarges only the key control menus most related to a current video displayed on the display part 260 among a plurality of predetermined control menus displayed on the lower area of the display part 260, and displays the enlarged key control menus on the right area of the display part 260 (operation S312). It is understood that the key control menus may be set by a user. Furthermore, it is understood that according to other aspects of the present invention, the key control menus may be displayed when a user configures the display screen 400 to display the key control menus and/or as a default when the speed sensor 220 detects that the vehicle is moving. As illustrated in FIG. 4, the display screen 400 includes a first section 410 to display video information, a second section 420 to display the DMB video or a corresponding predetermined control menu, and a third section 430 to display an enlarged key control menu. At this time, a channel-up menu 432, a channel-down menu 434, and a volume menu 436 are displayed on the third section 430.

According to an aspect of the present invention, the controller 270 may output a video control signal to the video processing part 250 to reduce an area in which a video is displayed considering a position of the enlarged key control menu displayed on the display part 260. The video processing part 250 generates the video data to decrease or increase a corresponding viewing window according to the video control signal. The processing part 250 may, for example, decrease or increase a wide screen video or a normal screen video in size by performing a scaling from, respectively, wide video data to normal video data or from normal video data to wide video data.

If a display area of the enlarged key control menu is touched, the pointer detecting part 272 detects a coordinate value of the touched section, and provides the detected coordinate value to the controller 270 (operation S314). However, it is understood that, according to other aspects of the present invention, input devices other than a touch screen may be used to receive a user input. Then, the controller 270 reads out respective coordinate values corresponding to a plurality of the enlarged key control menus, which are stored in the control information storing part 274, and compares the detected coordinate value provided from the pointer detecting part 272 with the respective coordinate values stored in the control information storing part 274.

In particular, if a touched display area of an enlarged control is, for example, a channel menu (operation S316), the controller 270 controls the tuner 232 to tune a channel depending on the enlarged channel menu in order to display a video corresponding to a tuned channel on the display part 260. Particularly, if a touched display area of an enlarged channel menu is a channel-up menu 432, the controller 270 applies a control voltage signal to the tuner 232 to increase a channel number corresponding to a current-displayed video by a predetermined number. Then, the tuner 232 tunes a channel corresponding to an increased channel number according to the control voltage signal. If a touched display area of an enlarged control menu is a channel-down menu 432, the controller 270 applies another control voltage signal to the tuner 232 to decrease the channel number corresponding to the current-displayed video by a predetermined number. Then, the tuner 232 tunes a channel corresponding to a decreased channel number according to the control voltage signal (operation S318).

On the other hand, if a touched display area of the enlarged control menu is not a channel menu, the controller 270 checks whether a touched display area of an enlarged control menu is a volume menu 436 (operation S320).

If the touched display area of the enlarged control menu is the volume menu 436, the controller 270 applies a volume control signal to the audio processing part 240 according to the touched volume menu 436. Then, the audio processing part 240 adjusts a volume of a corresponding audio according to the volume control signal, and outputs the audio to, for example, the speaker 242 (operation S322). According to an aspect of the present invention, if the user adjusts a volume level as desired by dragging an adjusting bar positioned on a current volume level left and right, the pointer detecting part 272 detects a location value of the adjusting bar positioned on a desired volume level according to control of the controller 270. Then, the controller 270 generates the volume control signal based on the detected location value, and applies the generated volume control signal to the audio processing part 240.

Figure 5:
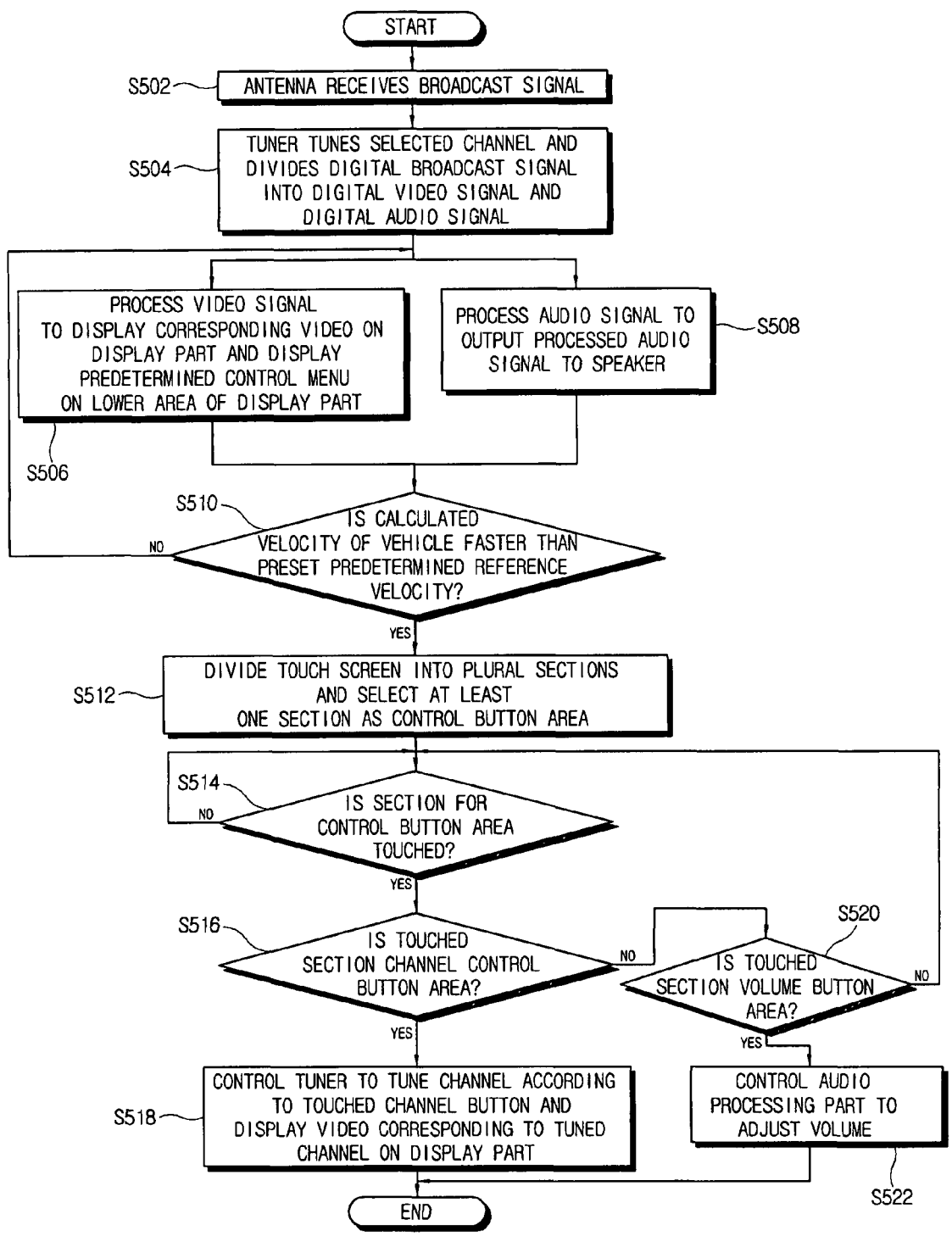
FIG. 5 is another flowchart illustrating a control method of the handheld information device according to another embodiment of the present invention.
Figure 6:
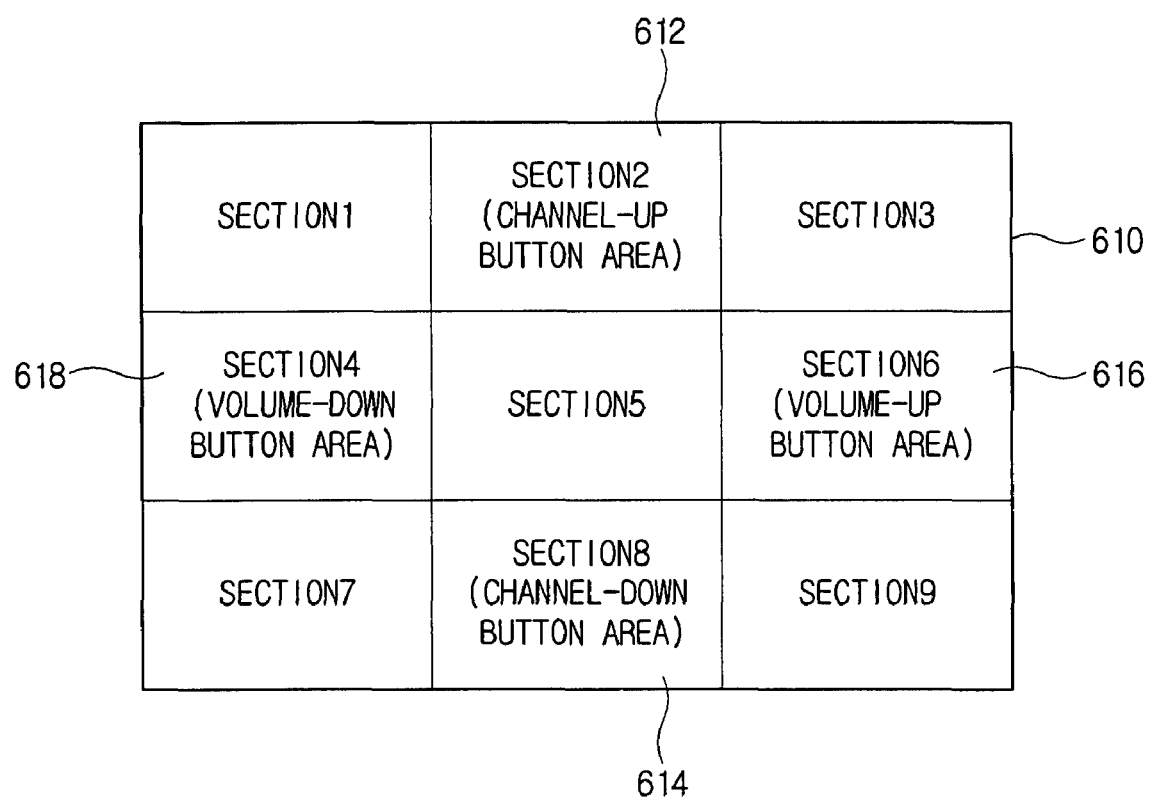
FIG. 6 is a view illustrating a touch screen including a divided control button area having a predetermined size of the handheld information device according to another embodiment of the present invention.

FIG. 5 is another flowchart illustrating a control method of the handheld information device 200 according to another embodiment of the present invention, and FIG. 6 is a view illustrating a touch screen including a divided control button area having a predetermined size of the handheld information device 200 of FIG. 5.

The antenna 230 receives a satellite digital broadcast signal and/or a ground wave digital broadcast signal (operation S502). The tuner 232 tunes the digital broadcast signal having a frequency corresponding to a channel selected by a user from the digital broadcast signals received by the antenna 230. Also, the tuner 232 processes the digital broadcast signal to divide it into a digital video signal and a digital audio signal. At this time, the digital video signal is outputted to the video processing part 250, and the digital audio signal is outputted to the audio processing part 240 (operation S504).

The video processing part 250 processes the received digital video signal and displays a corresponding video to the display part 260, and the controller 270 displays a plurality of control menus on a lower area of the display part 260 (operation S506). Further, the audio processing part 240 generates audio data by decoding the received digital audio signal, and outputs the generated audio data through, for example, the speaker 242 (operation S508).

The controller 270 checks whether a calculated velocity of a vehicle is greater than a predetermined reference velocity (operation S510). As a result of the checking, if the calculated velocity is greater than the predetermined reference velocity, as illustrated in FIG. 6, the controller 270 divides a touch screen of the display part 260 into a plurality of sections having predetermined areas to receive a user input without changing a video currently displayed on the touch screen and to select at least one section of the divided sections for a control button area (operation S512). For example, as illustrated FIG. 6, the touch screen 610 includes nine divided sections. Particularly, the controller 270 allocates a channel button area 612 and 614 on divided sections 2 and 8. The controller 270 locates a channel-up button at a portion 612 of the channel button area 612 and 614 on a divided section 2, and a channel-down button at a portion 614 of the channel button area 612 and 614 on a divided section 8. Similarly, the controller 270 allocates a volume button area 616 and 618 on divided sections 4 and 6. The controller 270 locates a volume-down button at a portion 618 of the volume button area 616 and 618 on a divided section 4, and a volume-up button at a portion 616 of the volume button area 616 and 618 on a divided section 6. However, aspects of the present invention are not limitable thereto. Alternatively, the controller 270 divides the touch screen into four or six sections having predetermined areas to select at least one section as a control button area.

Then, if the control button area is touched, the pointer detecting part 272 detects a coordinate value corresponding to the touched control button area, and provides the detected coordinate value to the controller 270 (S514). It is understood that, according to other aspects of the present invention, other input devices other than a touch screen may be used to receive a user input. The controller 270 reads out respective coordinate values corresponding to a plurality of control button areas, which are stored in the control information storing part 274, and compares the detected coordinate value provided from the pointer detecting part 272 with the respective coordinate values stored in the control information storing part 274.

In particular, if a touched display section is the channel button area 612 and 614 (operation S516), the controller 270 controls the tuner 232 to tune a channel depending on the touched channel button in order to display a corresponding video on the display part 260 (operation S518). Particularly, if a touched section is the channel-up button portion 612, the controller 270 applies a control voltage signal to the tuner 232 to increase a channel number corresponding to a current-displayed video by a predetermined number. Then, the tuner 232 tunes a channel corresponding to the increased channel number according to the control voltage signal. If a touched section is a channel-down button portion 614, the controller 270 applies another control voltage signal to the tuner 232 to decrease the channel number corresponding to the current-displayed video by a predetermined number. Then, the tuner 232 tunes a channel corresponding to the decreased channel number according to the control voltage signal.

On the other hand, if a touched section is not the channel button area 612 and 614, the controller 270 checks whether a touched section is the volume button area 616 and 618 (operation S520).

In particular, if the volume button area 616 and 618 is touched, the controller 270 applies a volume control signal to the audio processing part 240 according to the touched volume button. Then, the audio processing part 240 adjusts a corresponding volume according to the volume control signal and outputs audio having the adjusted volume to the speaker 242 (operation S522). Particularly, if a touched section is the volume-up button portion 618, the controller 270 applies a volume control signal to the audio processing part 240 to increase the volume corresponding to a currently outputted audio by a predetermined amount. If a touched section is the volume-down button portion 616, the controller 270 applies another volume control signal to the audio processing part 240 to decrease the volume corresponding to the currently outputted audio by a predetermined amount.

As is apparent from the above description, according to aspects of the present invention, there is provided a handheld information device and a control method thereof that can provide a control menu that a user conveniently manipulates while driving a vehicle.

Although a few embodiments of the present invention have been shown and described, it will be appreciated by those skilled in the art that changes may be made in this embodiment without departing from the principles and spirit of the invention, the scope of which is defined in the claims and their equivalents.

What is claimed is:

1. An information device used in a vehicle, the information device comprising:
   a display part to display one or more control menus in a first display mode or a second display mode; and
   a controller to calculate a velocity of the vehicle, and to control the display part to display the one or more control menus in the second display mode if the calculated velocity is greater than a predetermined reference velocity,
   wherein the one or more control menus displayed in the first display mode have a first size and the one or more control menus displayed in the second display mode have a second size larger than the first size.

2. The information device as claimed in claim 1, wherein:
   the display part comprises a touch screen provided on a display surface of the display part, and
   if a touch area of a desired control menu is touched, the controller performs a function corresponding to the desired control menu.

3. The information device as claimed in claim 1, wherein if the calculated velocity is less than the predetermined reference velocity, the controller controls the display part to display the one or more control menus in the first display mode.

4. The information device as claimed in claim 3, further comprising:
   a video processing part to generate video data from an inputted video signal; and
   a video combining part to combine the generated video data and the one or more control menus such that the display part displays the video data and the one or more control menus.

5. The information device as claimed in claim 4, wherein the video processing part generates the video data to have a first video size when the one or more control menus are displayed in the first display mode or to have a second video size, smaller than the first video size, when the one or more control menus are displayed in the second display mode.

6. The information device as claimed in claim 5, wherein the video processing part generates the video data to have the second video size by performing, on the video data having the first video size, a scaling from wide video data to normal video data.

7. The information device as claimed in claim 5, wherein the video processing part generates the video data to have the first video size by performing, on the video data having the second video size, a scaling from normal video data to wide video data.

8. The information device as claimed in claim 4, wherein the video combining part combines the generated video data and the one or more control menus displayed in the second display mode by changing display positions of the generated video data and/or the one or more control menus on the display part.

9. The information device as claimed in claim 4, wherein the one or more control menus displayed in the second display mode are displayed more transparently than the one or more control menus displayed in the first display mode.

10. The information device as claimed in claim 4,
    further comprising a tuner to tune a broadcast channel,
    wherein the display part displays a channel menu, of the one or more control menus, such that if a display area of the channel menu is selected, the controller controls the tuner to tune another broadcast channel.

11. The information device as claimed in claim 4,
    further comprising an audio processing part to generate audio data from an inputted audio signal,
    wherein the display part displays an audio menu, of the one or more control menus, such that if a display area of the audio menu is selected, the controller controls the audio processing part to change an output volume of the generated audio data.

12. The information device as claimed in claim 4, wherein the controller controls the display part to only display control menus, of the one or more control menus, most related to the generated video data while in the second display mode.

13. The information device as claimed in claim 4, wherein the controller controls the display part to only display control menus, of the one or more control menus, selected by a user while in the second display mode.

14. The information device as claimed in claim 1, further comprising a menu information generating part to generate at least one of the control menus to be displayed in the first display mode and to generate at least one of the control menus to be displayed in the second display mode.

15. An information device used in a vehicle, the information device comprising:
    a display part to display video data;
    a video processing part to generate the video data from an inputted video signal; and
    a controller to calculate a velocity of the vehicle, and to divide the display part into a plurality of sections if the calculated velocity is greater than a predetermined reference velocity such that at least one section of the plurality of sections is a control menu area.

16. The information device as claimed in claim 15,
    further comprising a tuner to tune a broadcast channel, wherein the control menu area comprises a channel button section, and the controller controls the tuner to tune another broadcast channel if the channel button section is selected.

17. The information device as claimed in claim 16, wherein the channel button section comprises a channel-up button area and a channel-down button area, such that the controller controls the tuner to tune a higher broadcast channel when the channel-up button area is selected and the controller controls the tuner to tune a lower broadcast channel when the channel-down button area is selected.

18. The information device as claimed in claim 17, wherein the channel-up button area is located above the channel-down button area.

19. The information device as claimed in claim 15,
further comprising an audio processing part to generate audio data from an inputted audio signal,
wherein the control menu area comprises a volume button section on the control button area of the selected section, and the controller controls the audio processing part to change an output volume of the generated audio data if the volume button section is selected.

20. The information device as claimed in claim 19, wherein the volume button section comprises a volume-up button area and a volume-down button area, such that the controller controls the audio processing part to increase the output volume when the volume-up button area is selected and the controller controls the audio processing part to decrease the output volume when the volume-down button area is selected.

21. The information device as claimed in claim 20, wherein the volume-up button area is located in a first area of the control menu area and the volume-down button area is located in a second area, left of the first area, of the control menu area.

22. The information device as claimed in claim 15, wherein:
the display part comprises a touch screen provided on a display surface of the display part; and
if a touch area of the control menu area is touched, the controller performs a function corresponding to the control menu area.

23. The information device as claimed in claim 15, wherein the control menu area comprises one or more control menus such that if an area corresponding to a first control menu is selected, the controller performs a function corresponding to the first control menu.

24. The information device as claimed in claim 23, wherein the one or more control menus are most related, from a plurality of control menus, to the generated video data.

25. The information device as claimed in claim 23, wherein the one or more control menus are selected to be provided by a user from a plurality of control menus.

26. A control method of an information device used in a vehicle, the control method comprising:
calculating a velocity of the vehicle;
displaying one or more control menus in a first display mode if the calculated velocity is less than a predetermined reference velocity;
displaying the one or more control menus in a second display mode if the calculated velocity is greater than a predetermined reference velocity; and
performing a function corresponding to a desired control menu if a display area of the desired control menu is selected,
wherein the one or more control menus displayed in the first display mode have a first size and the one or more control menus displayed in the second mode have a second size larger than the first size.

27. The control method as claimed in claim 26, wherein:
the display area is a touch screen; and
the performing of the function corresponding to the desired control menu comprises performing the function if the display area of the desired control menu is touched.

28. The control method as claimed in claim 26, further comprising:
generating video data from an inputted video signal; and
combining the generated video data at the one or more control menus and display the combined video data and the one or more control menus.

29. The control method as claimed in claim 28, wherein the combining of the generated video data and the one or more control menus comprises:
generating the video data to have a first video size when the one or more control menus are displayed in the first display mode; and
generating the video data to have a second video size, smaller than the first video size, when the one or more control menus are displayed in the second display mode.

30. The control method as claimed in claim 29, wherein the generating of the video data to have the second video size comprises:
performing, on the video data having the first video size, a scaling from wide video data to normal video data.

31. The control method as claimed in claim 29, wherein the generating of the video data to have the first video size comprises:
performing, on the video data having the second video size, a scaling from normal video data to wide video data.

32. The control method as claimed in claim 28, wherein the combining of the generated video data and the one or more control menus comprises:
changing display positions of the generated video data and/or the one or more control menus.

33. The control method as claimed in claim 26, wherein one or more control menus displayed in the first display mode have a first transparency and the one or more control menus displayed in the second mode have a second transparency greater than the first transparency.

34. The control method as claimed in claim 28, wherein the displaying of the control menus in the second display mode comprises:
display only control methods, of the one or more control methods, most related to the generated video data.

35. A control method of an information device used in a vehicle, the control method comprising:
calculating a velocity of the vehicle;
dividing a display part of the information device into a plurality of sections if the calculated velocity is greater than a predetermined reference velocity such that at least one section of the plurality of sections is a control menu area; and
performing a function corresponding to the control menu area if the control menu area is selected.

36. The control method as claimed in claim 35, wherein:
the display area is a touch screen; and
the performing of the function corresponding to the control menu area comprises performing the function if the control menu area is touched.

37. The control method as claimed in claim 35, further comprising:
tuning a broadcast channel,
wherein:
the control menu area comprises a channel button section, and the performing of the function comprises tuning another broadcast channel if the channel button section is selected.

38. The control method as claimed in claim 37, wherein:
the channel button section comprises a channel-up button area and a channel-down button area, and
the performing of the function comprises tuning a higher broadcast channel when the channel-up button area is selected and tuning a lower broadcast channel when the channel-down button area is selected.

39. The control method as claimed in claim 38, wherein the channel-up button area is located above the channel-down button area.

40. The control method as claimed in claim 35, further comprising:
generating audio data from an inputted audio signal, wherein:
the control menu area comprises a volume button section, and
the performing of the function comprises changing an output volume of the generated audio data if the volume button section is selected.

41. The control method as claimed in claim 40, wherein:
the volume button section comprises a volume-up button area and a volume-down area button, and
the performing of the function comprises increasing the output volume when the volume-up button area is selected and decreasing the output volume when the volume-down button area is selected.

42. The control method as claimed in claim 41, wherein the volume-up button area is located in a first area of the control menu area and the volume-down button area is located in a second area, left of the first area, of the control menu area.

43. The control method as claimed in claim 35, wherein:
the control menu area comprises one or more control menus, and
the performing of the function corresponding to the control menu area comprises performing a function corresponding to a first control menu if the first control menu is selected.

* * * * *